March 8, 1966 F. G. STEELE 3,239,687

SWITCH CONTROLLED GATING NETWORK

Original Filed April 7, 1955

INVENTOR.
FLOYD G. STEELE
BY
Seymour M. Rosenberg
ATTORNEY

United States Patent Office 3,239,687
Patented Mar. 8, 1966

3,239,687
SWITCH CONTROLLED GATING NETWORK

Floyd George Steele, La Jolla, Calif., assignor to Digital Control Systems, Inc., La Jolla, Calif.

Continuation of application Ser. No. 602,260, Aug. 6, 1956, which is a division of application Ser. No. 499,779, Apr. 7, 1955, now Patent No. 2,933,248, dated Apr. 19, 1960. This application Dec. 18, 1962, Ser. No. 246,303
9 Claims. (Cl. 307—88.5)

This application is a continuation of application Serial No. 602,260 entitled "Switch Controlled Gating Network," filed August 6, 1956, now abandoned, which is a division of application Serial No. 499,779, now Patent No. 2,933,248, entitled "High Speed Digital Control System," filed April 7, 1955, by the present inventor. The specifications and drawings of this application are identical to said abandoned application, Serial No. 602,260, the present application differing therefrom only in the presence of additional claims.

The present invention relates to multiple-input switch-controlled gating networks and more particularly to a switch-controlled gating network responsive to a plurality of bilevel input signals, including at least one bilevel input signal applied through a switch, for producing an output signal only when all of the input signals are at a predetermined level and the switch is closed.

Although logical gating circuits such as "and" and "or" gates, as employed in modern digital computing machines, are for the most part responsive only to bilevel (high and low) voltage signals produced by extremely high speed electronic devices, it is also important that the overall functioning of such gating circuits be modifiable in accordance with the opening or closing of switches controlled by the human operators of such machines. It is in this way that an operator is able to maintain general supervisory control over the operations of the machine.

It has been common, in the prior art, to utilize switches in which the pole of a switch was connected to high and low voltages respectively at two positions of the switch, these high or low voltages thus being coupled to the pole of the switch, and from there being applied to subsequent gating circuits to thereby affect the operation of the gating circuits in accordance with the position of the switch.

For example, suppose that a bilevel output signal S were to be generated in accordance with prior art methods, the signal S having a high level only when a bilevel signal $A_1$ has a high level and a second bilevel input signal $A_2$ has a high level and a two position switch Z is in a predetermined position. Restating this requirement in terms of a Boolean logical equation, it is required that:

$$S=A_1.A_2.Z$$

where the dots (.) signify the performance of the logical "and" operation upon the conditions joined thereby.

According to the methods ordinarily used in the prior art, the signal S might be generated by utilizing a conventional three input "and" gate which produces a high level output signal only when high level signals are applied to all of the inputs of the gate. The signals $A_1$ and $A_2$ would be applied respectively to two of the inputs of the "and" gate and the pole of the two position switch Z would be connected to the third input of the "and" gate, the pole of switch Z making contact to a source of high level voltage when it is at its predetermined position and making contact to a source of low level voltage when it is at its other position. The output signal produced by the "and" gate will then be the required signal S.

However it should be understood, that with such a mechanization, the "and" gate must have as many inputs as there are input conditions. Thus in the present example, if a diode "and" gate were utilized, it would employ three diode rectifiers, one rectifier for each of the gate inputs. Since diode rectifiers are relatively expensive and of limited reliability it is obviously desirable to reduce the number of diode rectifiers employed. It will be shown hereinafter that, in accordance with the present invention, switch controls may be introduced without requiring additional gate inputs, so that the introduction of such switches is made without additional cost in terms of diode rectifiers or other non-linear gating elements.

Another disadvantage of the type of prior art switch-controlled gating network described above is that while the pole of the control switch is traversing between its two positions, an extremely high impedance open circuit is presented to the corresponding input of the gating circuit. This high impedance open circuit may readily have undesired crosstalk signals induced in or capacitatively coupled thereto from adjacent circuits, thereby destroying the operation of the gating circuit during the transitional period in which the switch traverses from one to another of its positions. In contrast, in the practice of the present invention a switch controlled input to a gating circuit is never opened but is instead always maintained at a relatively low impedance level so that crosstalk signals cannot be coupled thereto.

It is accordingly an object of the invention to provide a novel input gating network for producing electrical output signals whenever a plurality of input conditions, expressible by closure of at least one electrical switch and the receipt of predetermined signals from a plurality of input signal sources, is satisfied.

It is another object of the invention to provide a switch controlled gating network responsive to a plurality of input signals, including at least one bilevel signal applied through a switch, for producing an output signal only when all of the input signals are at a predetermined level and the switch is closed.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
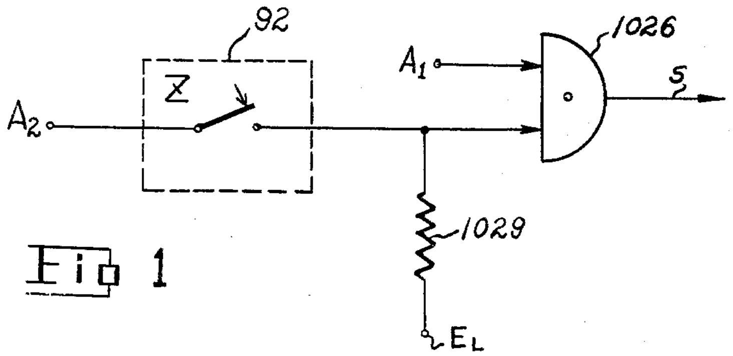
FIG. 1 is a partly block, partly circuit diagram of a preferred embodiment of a switch-controlled gating network in accordance with the present invention.

Referring now to the drawings wherein like or corresponding parts are designated by corresponding reference characters, there is shown in FIG. 1 a partly block, partly circuit diagram of a preferred embodiment of a switch controlled gating network in accordance with the present invention which is seen to include a two terminal "and" gate 1026 and a Z switch designated 92. As shown in FIG. 1, a bilevel voltage signal $A_1$ is applied to one input of "and" gate 1026 while a second bilevel voltage signal $A_2$ is applied through switch 92 to a second input of "and" gate 1026. In this way the source (not shown) of signal $A_2$ is either connected to or disconnected from the second input of "and" gate 1026 in accordance with switch 92 being in its open or closed position. The logical significance of this gating network is that a high level output signal S is produced by gate 1026 only when signal $A_1$ at its high level is applied to gate 1026 and the Z switch is closed and the applied bilevel signal $A_2$ is at its high level. It will be recognized that combining these terms produces the following logical equation which defines the output signal S:

$$S = A_1 . A_2 . Z$$

It will be noted that the gating network for producing the signal S also includes a resistor 1029 which is connected at one end to the second input of gate 1026 and at its other end to a terminal $B_L$ of a source of relatively low potential (not shown). The purpose of this resistor is to maintain the output conductor from switch 92 at a low voltage level whenever the switch is open in order to maintain "and" gate 1026 as a two input terminal "and" gate. In other words, if resistor 1029 were omitted gate 1026 would act as a one input terminal "and" gate whenever switch 92 was opened, and consequently the signal $A_1$ would be passed by gate 1026 independently of the level of signal $A_2$.

It will be noted that, in the practice of the present invention as described above, an "and" gate having only two inputs produces an output signal S which is an "and" function of three input conditions. What has been accomplished is that the condition of the switch Z has been introduced without requiring an additional gate input. Those skilled in the art will recognize, that in accordance with the invention, switch control of "and" gates may always be accomplished in this manner without cost in terms of gate inputs. Since each input to an "and" gate ordinarily requires at least one rectifier or other non-linear element, it is clear that the number of components required (and hence cost and loss of reliability) may be considerably reduced by utilizing the switch controlled gating networks of the present invention.

In the above description of the invention, reference has been made to an "and" gate which, as is well-known to those skilled in the art, is a circuit including two or more inputs and a single output and responsive to the voltage levels of two-level signals applied to its input terminals for producing a high level voltage output signal only when all of the input signals are at their high level values. "And" gates may utilize vacuum tubes, crystal rectifiers or other non-linear elements. The operation and structure of "and" gates is explained in numerous publications, as for example in the article entitled "How an Electronic Brain Works" by Berkely and Jensen found on page 45 of the September 1951 issue of Radio Electronics Magazine, or in the article entitled "An Algebraic Theory for Use in Digital Computer Design" by Nelson, found on page 12 of the September 1954 issue of the Transactions of the IRE Professional Group on Electronic Computers.

Figure 2:
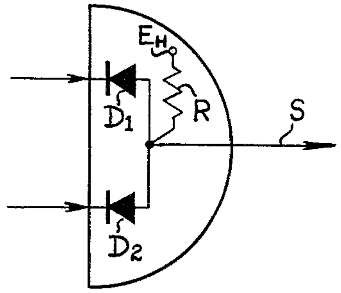
FIG. 2 is a circuit diagram of one embodiment of a gating circuit utilized in the network shown in FIG. 1.

However for purposes of convenient reference a circuit diagram of a preferred embodiment of "and" gate 1026 is shown in FIG. 2, this embodiment being a two input "and" gate mechanized with two diode rectifiers $D_1$ and $D_2$ and a resistor R. As shown in FIG. 2 the cathodes of diodes $D_1$ and $D_2$ serve as the respective inputs of the "and" gate and the anodes of the rectifiers are connected to a common junction terminal $E_H$ of a source of a relatively high potential, not shown. In operation, as is well-known in the art, the signal S existing at the common junction terminal and on the output conductor will be maintained at a level corresponding to the lowest voltage applied to the cathodes of diodes $D_1$ and $D_2$, since the corresponding diode would then be biased in its conductive direction so that the diode would thereby establish a short circuit between the common junction terminal and the source of low voltage. Thus the input signal S can have a high voltage level only when all of the applied input signals are at their high levels.

What is claimed as new is:

1. A multiple input gating network for producing an electrical output signal whenever a plurality of input conditions, expressible by the closure of at least one electrical switch and the receipt of high level input signals from a plurality of input signal sources, are satisfied, said gating circuit comprising: an "and" gate circuit having an output terminal and $n$ input terminals, said gating circuit being responsive to the simultaneous application of high level input signals to all of said $n$ input terminals for producing a high level output signal; means for intercoupling the $1^{st}$ . . . $(n-1)^{th}$ input terminal to a corresponding plurality of two-elevel input signal sources; a mechanical switch having an open position and a closed position and at least a pair of terminals, said pair of terminals being electrically interconnected when said switch is in its closed position and disconnected when said switch is in its open position; means for interconnecting one of said pair of terminals of said switch to the $n^{th}$ input terminal of said "and" gate; impedance means for applying a relatively low level voltage to said one terminal of said pair of terminals; and means for interconnecting the other of said pair of terminals to a two-level input signal source whereby said gating circuit produces a high level output signal only when the input signals from all of said input signal sources are at their high level value and said switch is closed.

2. The gating network defined in claim 1 wherein said impedance means includes a resistor of predetermined value and having first and second ends, said first end of said resistor being connected to said one terminal of said switch, and means for applying a relatively low level voltage to said second end of said resistor.

3. A multiple input electronic network for producing an electrical output signal whenever a plurality of input conditions are satisfied, said gating network comprising: an "and" gate having an output terminal and at least two input terminals, said "and" gate being responsive to the application of two-level input signals to its input terminals for producing an output signal each time the input signals received are at their high level value; means for applying a first two-level input signal to one of the input terminals of said "and" gate; an electrical switch having a pair of terminals and mechanical means for selectively closing an electrical circuit between said pair of terminals; means for interconnecting one of said pair of switch terminals to another input terminal of said "and" gate; and means for applying a second two-level input signal to the other of said pair of switch terminals; a resistor having first and second terminals, said first terminal of said resistor being connected to said one switch terminal; and means for applying a relatively low level voltage to said second terminal of said resistor thereby to render said "and" gate inoperative whenever said switch is open.

4. A multiple input gating network for producing an electrical output signal whenever a plurality of input conditions, expressible by the closure of at least one electrical switch and the receipt of high level input signals from a plurality of input signal sources are satisfied, said gating circuit comprising: an "and" gate circuit having an output terminal, a plurality of $n$ input terminals, and a respectively corresponding plurality of $n$ non-linear resistive elements intercoupled between said input terminals and said output terminal, said gating circuit being responsive to the simultaneous application of high level output signals to all of said $n$ input terminals for producing a high level output signal; means for intercoupling the $1^{st}$ . . . $(n-1)^{th}$ input terminal to a corresponding plurality of two-level input signal sources; a mechanical switch having an open position and a closed position and at least a pair of terminals, said pair of terminals being electrically interconnected when said switch is in its closed position and disconnected when said switch is in its open position; means for interconnecting one of said pair of terminals of said switch to the $n^{th}$ input terminal of said "and" gate; impedance means for applying a relatively low level voltage to said one terminal of said pair of terminals; and means for interconnecting the other of said pair of terminals to a two-level input signal source whereby said gating circuit produces a high level output signal only when the input signals from all of said input signal sources are at their high level value and said switch is closed.

5. The combination defined by claim 4 wherein each of said $n$ non-linear resistive elements comprises a rectifier element.

6. The combination defined by claim 4 wherein said impedance means has a resistive impedance which is relatively high compared to the impedance of the two-level input signal source connected to said other of said pair of terminals, and relatively low compared to the impedance of said "and" gate.

7. A multiple input electronic gating network for producing an electrical output signal whenever a plurality of input conditions are satisfied, said gating network comprising: an "and" gate having a plurality of at least two input terminals and a respectively corresponding plurality of non-linear impedance elements, each of said non-linear impedance elements being coupled to the corresponding input terminal for operating upon input signals applied thereto, said "and" gate being responsive to the application of two-level input signals to its input terminals for producing an output signal each time the input signals received are at their high level value; means for applyin a first two-level input signal to one of the input terminals of said "and" gate; an electrical switch having a pair of terminals and mechanical means for selectively closing an electrical circuit between said pair of terminals; means for interconnecting one of said pair of switch terminals to another input terminal of said "and" gate; and means for applying a second two-level input signal to the other of said pair of switch terminals; a resistor having first and second terminals, said first terminal of said resistor being connected to said one switch terminal; and means for applying a relatively low level voltage to said second terminal of said resistor thereby to render said "and" gate inoperative whenever said switch is open.

8. The combination defined by claim 7 wherein said non-linear impedance elements are semiconductor rectifying elements.

9. The combination defined by claim 7 wherein said resistor has an impedance substantially larger than the impedance of the source of said second two-level signal and substantially smaller than the input impedance of said "and" gate at said another input terminal of said "and" gate.

References Cited by the Examiner

UNITED STATES PATENTS 2,781,968 2/1957 Chenus ------------ 340—149

OTHER REFERENCES

Proceedings of the IRE, May 1950, pp. 511–514, vol. 38, issue 5.

ARTHUR GAUSS, *Primary Examiner.*